(12) United States Patent
Lee

(10) Patent No.: US 9,729,681 B2
(45) Date of Patent: *Aug. 8, 2017

(54) DATA TRANSMISSION METHOD AND DATA RESTORATION METHOD

(71) Applicant: Anapass Inc., Seoul (KR)

(72) Inventor: Yong Jae Lee, Yonginsi (KR)

(73) Assignee: ANAPASS INC., Seoul (KR)

( * ) Notice: Subject to any disclaimer, the term of this patent is extended or adjusted under 35 U.S.C. 154(b) by 151 days.

This patent is subject to a terminal disclaimer.

(21) Appl. No.: 14/806,760

(22) Filed: Jul. 23, 2015

(65) Prior Publication Data

US 2015/0350389 A1 Dec. 3, 2015

Related U.S. Application Data

(63) Continuation-in-part of application No. 14/036,107, filed on Sep. 25, 2013, now Pat. No. 9,166,769.

(30) Foreign Application Priority Data

Sep. 28, 2012 (KR) .......................... 10-2012-0109243

(51) Int. Cl.
*H04L 29/08* (2006.01)
*H04L 29/06* (2006.01)
(Continued)

(52) U.S. Cl.
CPC ............ *H04L 69/324* (2013.01); *G09G 5/008* (2013.01); *H04L 7/0025* (2013.01); *H04L 25/49* (2013.01);
(Continued)

(58) Field of Classification Search
CPC ...... H04L 69/324; H04L 69/22; H04L 7/0025
See application file for complete search history.

(56) References Cited

U.S. PATENT DOCUMENTS 5,122,912 A 6/1992 Kanota et al.
7,436,904 B2 * 10/2008 Kwak .................. H04L 7/0337
327/141
(Continued)

FOREIGN PATENT DOCUMENTS

JP 02096982 4/1990
JP 05-109202 A 4/1993
(Continued)

OTHER PUBLICATIONS

May 2, 2017, Japanese Office Action for related JP application No. 2014-205794.

*Primary Examiner* — Rasheed Gidado
(74) *Attorney, Agent, or Firm* — Paratus Law Group, PLLC

(57) ABSTRACT

Disclosed are a data transmission method and a data restoration method. The data transmission method forming a plurality of transmission preparatory packets by dividing data to be transmitted by a predetermined number (n) of bits, forming a plurality of transition inducing packets having the predetermined number (n) of bits, different from the transmission preparatory packets, and not complementary to the transmission preparatory packets, and forming transition included data packets by performing a logical operation on the transition inducing packets and the respective transmission preparatory packets, transmitting the transition included data packets and the different transition inducing packets, wherein the forming of the transition included data packets comprises: forming the transition included data packets by performing the logical operation on periodically repeated packet bundles and different transition inducing packets.

20 Claims, 14 Drawing Sheets

(51) Int. Cl.
     *H04L 7/00*            (2006.01)
     *H04L 25/49*          (2006.01)
     *G09G 5/00*           (2006.01)

(52) U.S. Cl.
     CPC .......... *H04L 25/4904* (2013.01); *H04L 69/22* (2013.01); *G09G 2370/10* (2013.01)

(56) References Cited

U.S. PATENT DOCUMENTS

| | | | | |
|---|---|---|---|---|
| 7,920,115 B2 * | 4/2011 | Park | ................ | G09G 3/3688 |
| | | | | 345/89 |
| 8,009,742 B2 * | 8/2011 | Kim | ............... | H04N 21/234318 |
| | | | | 370/466 |
| 8,074,125 B2 * | 12/2011 | Lee | ................ | H03L 7/0812 |
| | | | | 714/700 |
| 8,077,166 B2 * | 12/2011 | Yeon | ................ | G09G 3/20 |
| | | | | 345/204 |

FOREIGN PATENT DOCUMENTS

| | | |
|---|---|---|
| JP | 06-112928 A | 4/1994 |
| JP | 2002-198805 A | 7/2002 |
| JP | 2006-066971 A | 3/2006 |
| JP | 2006-157269 A | 6/2006 |
| JP | 2011-155562 A | 8/2011 |

\* cited by examiner

FIG. 2
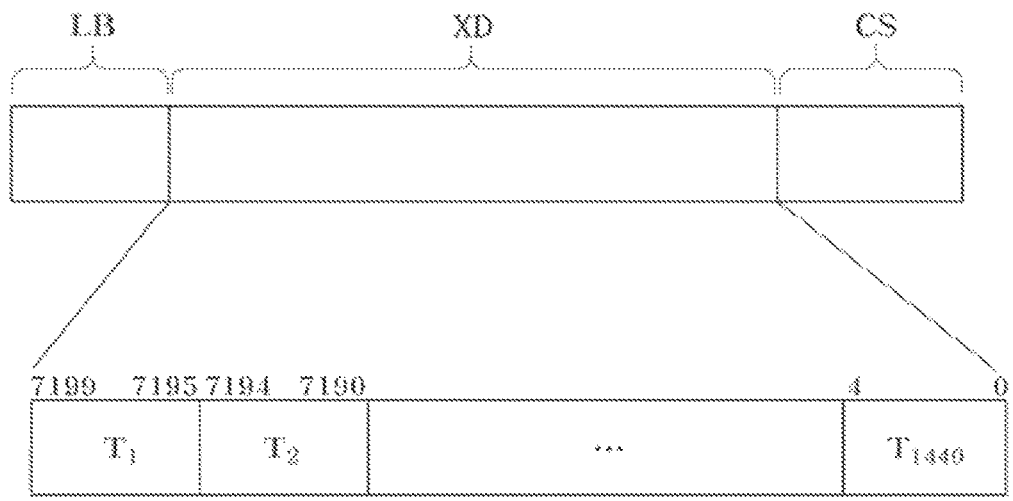
(a)
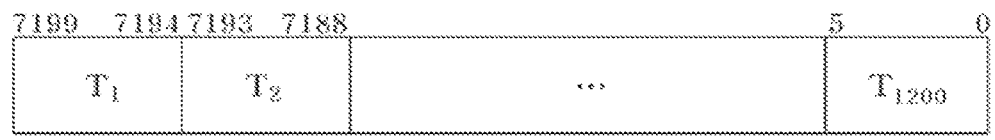
(b)
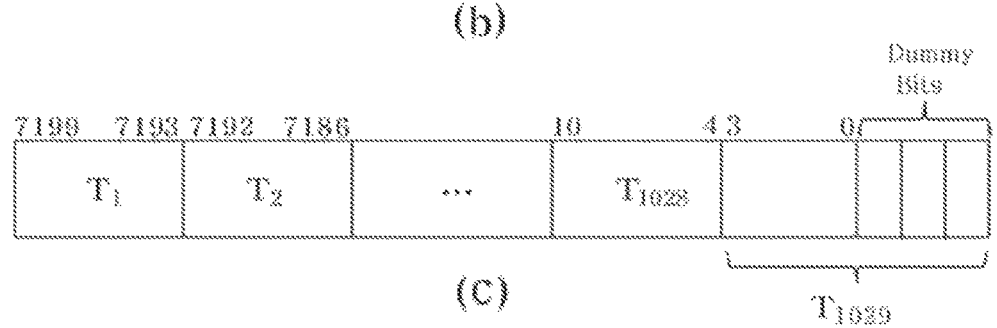
(c)

FIG. 12
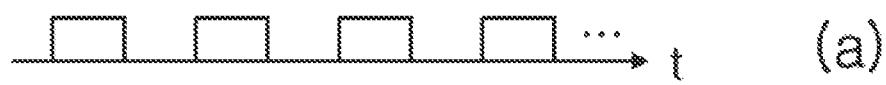
(a)
(b)

DATA TRANSMISSION METHOD AND DATA RESTORATION METHOD

CROSS-REFERENCE TO RELATED APPLICATION

This application is a continuation-in-part application of U.S. patent application Ser. No. 14/036,107 filed on Sep. 25, 2013, which claims priority to Korean Patent Application No. 2012-0109243 filed on Sep. 28, 2012, which are all hereby incorporated by reference in their entirety.

BACKGROUND

The present invention relates to a data transmission method and a data restoration method.

As interface technologies between a timing control unit and a data driving unit of a conventional display, a point to point differential signaling (PPDS) method that was released by National Semiconductor may be used. In the PPDS method, an independent data circuit is formed between the timing control unit and the driving unit. Such a PPDS method has an advantage that electromagnetic interference (EMI) is reduced and the number of overall signal lines is reduced, compared to a conventional reduced swing differential signaling (RSDS) method and a conventional mini-low voltage differential signaling (LVDS) method. A clock line and a load line are connected between the timing control unit and a plurality of data driving units.

In the conventional technologies, a separate transmission line is required to transmit clock signals. That is, since the clock signals are transmitted from the timing control unit to each of the plurality of data driving units through a separate line from data signals, a separate line for transmitting the clock signals is required, and therefore this causes an increase in complexity of the wiring, an increase in complexity of the manufacturing process, and an increase in the manufacturing costs. In addition, the clock signals having high frequencies may enable EMI to be increased, and when skew occurs between the data signals and the clock signals transmitted through the separate line, an error may occur at the time of data sampling.

SUMMARY

The present invention is directed to a method of transmitting data with high efficiency and a method of restoring the transmitted data. In addition, the present invention is also directed to a data transmission method which may reduce electromagnetic interference (EMI) by transmitting data together with clock information. In addition, the present invention is also directed to a data transmission method and a data restoration method, which may solve problems such as skew and jitter by transmitting data together with clock information.

According to an aspect of embodiment of the present invention, there is provided a data transmission method including: forming a plurality of transmission preparatory packets by dividing data to be transmitted by a predetermined number (n) of bits; forming a plurality of transition inducing packets having the predetermined number (n) of bits, different from the transmission preparatory packets, and not complementary to the transmission preparatory packets; and forming transition included data packets by performing a logical operation on the transition inducing packets and the respective transmission preparatory packets, transmitting the transition included data packets and the different transition inducing packets, wherein the forming of the transition included data packets comprises: forming the transition included data packets by performing the logical operation on periodically repeated packet bundles and different transition inducing packets.

According to another aspect of embodiment of the present invention, there is provided a data transmission method including: forming a plurality of transmission preparatory packets by dividing data to be transmitted by a predetermined number (n) of bits; forming a plurality of transition inducing packets having the predetermined number (n) of bits, different from the transmission preparatory packets, and not complementary to the transmission preparatory packets; forming transition included data packets by performing a logical operation using the transition inducing packets and the respective transmission preparatory packets; and transmitting the transition included data packets and the different transition inducing packets, wherein the forming of the transition included data packets is performed using transition inducing packets selected according to a number of transitions included in the data packets among the plurality of transition inducing packets.

According to another aspect of embodiment of the present invention, there is provided a data transmission method including: forming a plurality of transmission preparatory packets by dividing data to be transmitted by a predetermined number (n) of bits; forming a transition inducing packet having the predetermined number (n) of bits and different from the transmission preparatory packets; forming transition included data packets by performing a logical operation using the transition inducing packet and the respective transmission preparatory packets; transmitting a training pattern so that a reception side tracks a clock; and transmitting the transition included data packets and the transition inducing packet.

According to another aspect of embodiment of the present invention, there is provided a data restoration method including: receiving a tuning signal; tracking a clock using the tuning signal; receiving a transition inducing packet and a transition included data packet; restoring the clock using the received transition included data packet and the received transition inducing packet; sampling the transition inducing packet and the transition included data packet using the restored clock; and restoring transmitted data by performing a logical operation on the sampled transition inducing packet and the sampled transition included data packet.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 2 is a schematic diagram illustrating pixel data (XD) to be transmitted and a structure of a transmission preparatory packet;

FIG. 12 illustrates diagrams illustrating variations of an obtained data packet according to a selection of a transition inducing packet when the same transmission preparatory packet (T) is transmitted a plurality of times;

DETAILED DESCRIPTION

Figure 1:
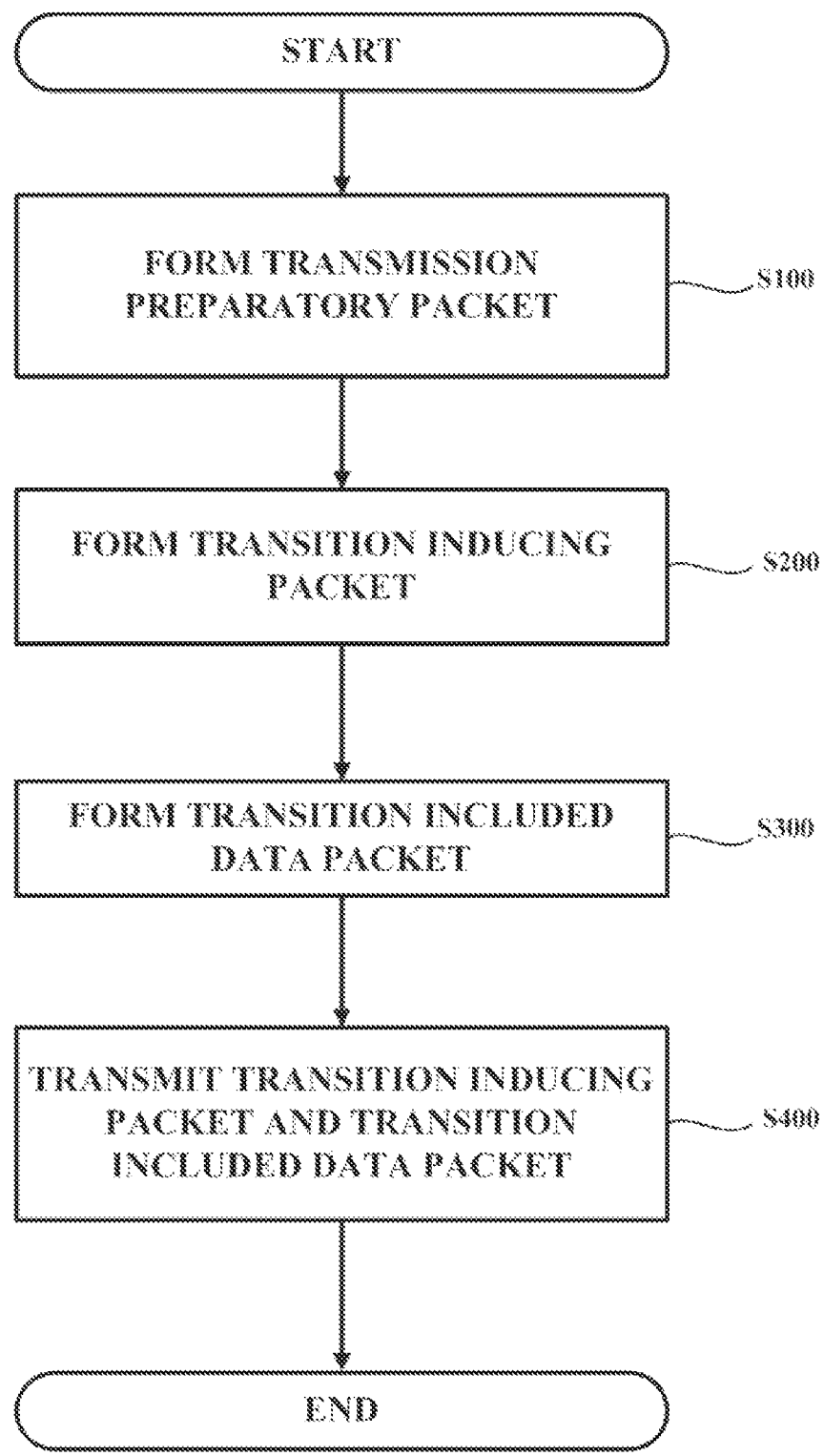
FIG. 1 is a schematic flowchart illustrating a data transmission method according to an embodiment of the present invention.

Example embodiments of the present invention are disclosed herein. However, specific structural and functional details disclosed herein are merely representative for purposes of describing example embodiments of the present invention, and example embodiments of the present invention may be embodied in many alternate forms and should not be construed as being limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described in detail with reference to the accompanying drawings. FIG. 1 is a schematic flowchart illustrating a data transmission method according to an embodiment of the present invention, and FIG. 2 is a schematic diagram illustrating a structure of pixel data (XD) to be transmitted and a transmission preparatory packet (T). Referring to FIGS. 1 and 2, the data transmission method according to an embodiment of the present invention includes operation S100 for forming a plurality of transmission preparatory packets by dividing data to be transmitted by the predetermined number (n) of bits, operation S200 for forming transition inducing packets different from the transmission preparatory packets while having the same number of bits as the transmission preparatory packets, operation S300 for forming transition included data packets by performing a logical operation on the transition inducing packet and each of the transmission preparatory packets, and operation S400 for transmitting the transition included data packets and the transition inducing packet.

According to an embodiment of the present invention, when a timing controller (not shown) transmits j bits of data for each channel to k channels, (j×k) bits of pixel data (XD) except a line blank (LB) region and a control signal (CS) should be transmitted to a display driver. By dividing (j×k) bits of pixel data (XD) by the predetermined number of bits, a transmission preparatory packet may be formed. As an example, as shown in FIG. 2A, when transmitting a total of 7200 bits of pixel data (XD) to the display driver, the total 7200 bits of pixel data (XD) may include 1440 transmission preparatory packets T1, T2 . . . T1440 each with 5 bits from a most significant bit (MSB) to a least significant bit (LSB). As an another example, as shown in FIG. 2B, when transmitting a total of 7200 bits of pixel data to the display driver, the total 7200 bits of pixel data (XD) may include 1200 transmission preparatory packets T1, T2 . . . T1200 each with 6 bits. As still another example, there is a case in which the total number of bits of the pixel data cannot be divided by the number of bits of the transmission preparatory packet. In this case, as shown in FIG. 2C, the required number of dummy bits are inserted to form the transmission preparatory packet. For example, as described above, when the pixel data (XD) is a total of 7200 bits and the number of bits of the transmission preparatory packet is 7, 1028 transmission preparatory packets may be formed, and 4 bits remain without forming the transmission preparatory packet. In this case, 3 dummy bits are added to form 1029th transmission preparatory packet T 1029. Content of the added dummy bits may have any form such as 101, 110, or the like.

However, this is merely for describing an embodiment of the present invention, and not intended to limit the present invention. Thus, the number of bits of the transmission preparatory packet may be determined as a different value. As another example, although not illustrated, an LSB to an MSB are aligned to form the transmission preparatory packet.

In general, a packet refers to a bundle of data bits which are transmitted through a network while having a header and a payload, but in the present specification, refers to a bit bundle obtained by dividing data to be transmitted so that the data has the predetermined number of bits.

Figure 3:
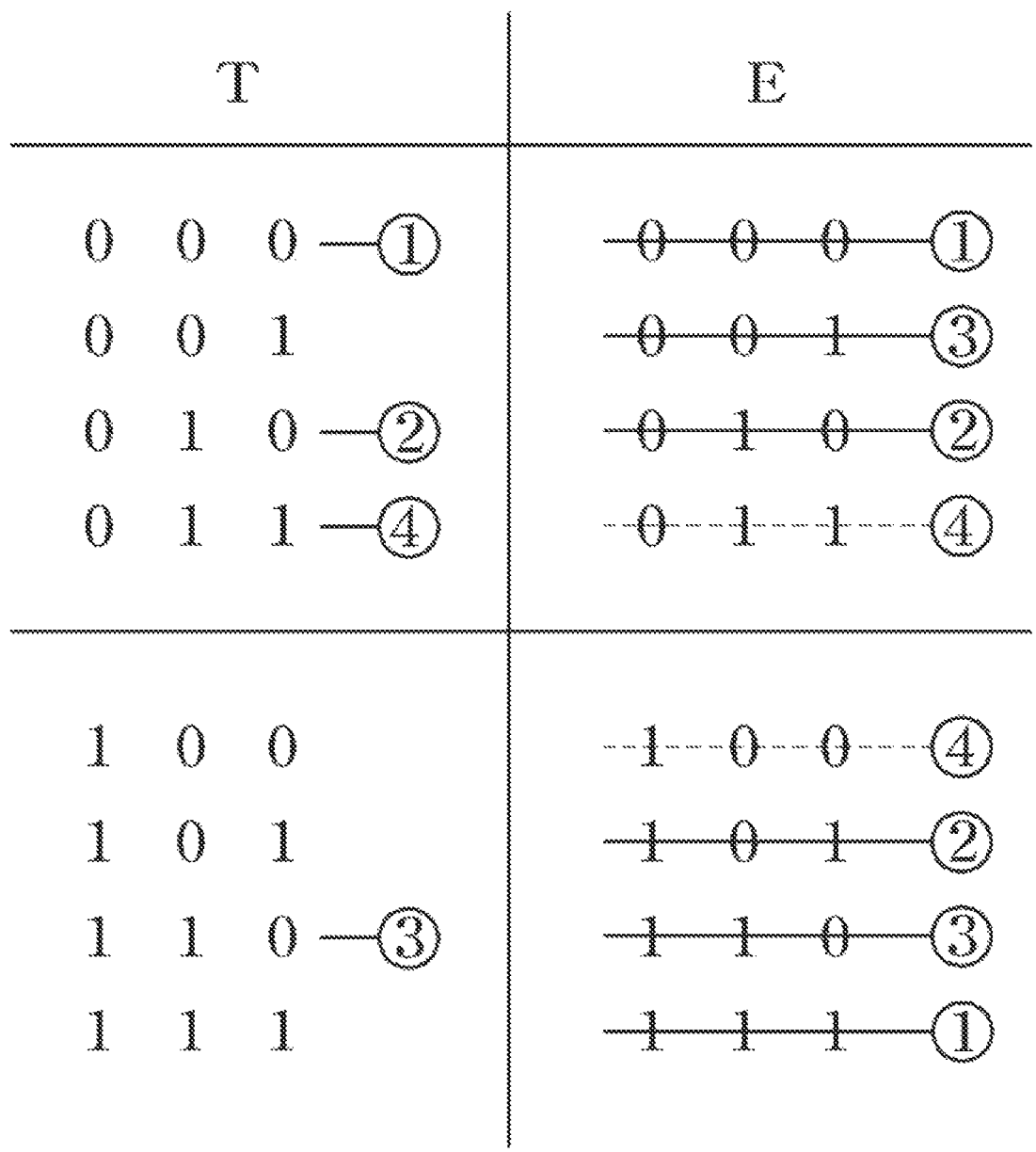
FIG. 3 is a diagram illustrating a method of forming a transition inducing packet.

Referring to FIGS. 1 and 3, in operation 200, the transition inducing packet (E) is formed. In an embodiment, a logical operation is performed on the transition inducing packet (E) and the predetermined number of transmission preparatory packets (T) to form data packets (DP) which are transmitted to the display driver (see FIG. 5), and at least one transition from 0 to 1 or from 1 to 0 is formed between adjacent bits in each data packet (DP) by the logical operation with the transition inducing packet (E). The transition inducing packet (E) acts to form a transition in the data packet which is transmitted to a data driver in a process of transmitting data as described above. In addition, in a process of restoration data, as will be described later, the transition inducing packet (E) serves as a seed of data restoration in the process of restoring data. Thus, the transition inducing packet (E) may be transmitted together with transition included data packets (DP).

In an embodiment, when an exclusive OR (XOR) operation is performed as an example of the logical operation which will be described later, the transition inducing packet (E) should not be equal or complementary to the transmission preparatory packet in order to form at least one transition in the transmission packet that is an operation result. As an example, it is assumed that the transmission preparatory packet and the transition inducing packet all have 3 bits. When the transmission preparatory packet (T) is 101, the transition inducing packet (E) should not be 101 or 010 which is equal or complementary to the transmission preparatory packet. In this case, when an XOR operation is performed on the transmission preparatory packet and the transition inducing packet, a result such as 000 or 111 is obtained, so that transition is not included in the operation result.

When the transition inducing packet (E) and the transmission preparatory packet (T) all have n bits, a single transition inducing packet (E) may be formed using $2^{\wedge}(n-1)-1$ mutually different transmission preparatory packets at maximum. Referring to FIG. 3, the left column indicates all cases of the transmission preparatory packet (T) enabled with 3 bits, and the right column indicates transition inducing packets also enabled with 3 bits. When the transmission preparatory packet to be initially transmitted is 000(①), 000 or 111 which is equal or complementary to the transmission preparatory packet cannot be used as the transition inducing packet in order to form a transition in the transmission packet. When a second transmission preparatory packet is 010(②), 010 or 101 cannot be used as the transition inducing packet in the same manner. When a third transmission preparatory packet is 110(③), 110 or 001 cannot be used the transition inducing packet. Subsequently, when 011 is a next transmission preparatory packet(④), 011 or 100 which is equal or complementary to the corresponding transmission preparatory packet cannot be used as the transition inducing packet, and therefore 3 bits of all transition inducing packets as shown in FIG. 3 cannot be used. Thus, at least one transition inducing packet with 3 bits may be obtained from 3 transmission preparatory packets which are different from each other, and conversely, three transition included data packets at maximum may be formed from one transition inducing packet with 3 bits.

Therefore, the following conclusions are reached. $2^{\wedge}(n-1)-1$ mutually different transmission preparatory packets with n bits at maximum are required in order to form one transition inducing packet with n bits. This is for the following reasons. When the number of cases of all transition inducing packets enabled with n bits is $2^{\wedge}(n)$ and one transmission preparatory packet with n bits is determined, two transition inducing packets cannot be used. Thus, the number of mutually different transmission preparatory packets which prevents $2^{\wedge}(n)$ transition inducing packets (E) from all being used is $2^{\wedge}(n)/2$, and therefore at least one transition inducing packet with n bits may be formed using $2^{\wedge}(n-1)-1$ mutually different transmission preparatory packets (T) at maximum.

The above-described number of mutually different transmission preparatory packets for forming one transition inducing packet is the maximum number, and it is possible to form a transition inducing packet with transmission preparatory packets numbering less than the maximum. As an embodiment, one transition inducing packet with 3 bits may be formed using $2^{\wedge}(3-1)-1=3$ transmission preparatory packets at maximum as described above, and it is also possible to form the transition inducing packet using two or one transmission preparatory packets, which is fewer than the maximum number. For example, the transition inducing packet such as 100 or 011 which is not equal or complementary to the transmission preparatory packet of 010 may be formed from the transmission preparatory packet of 010. As another embodiment, one transition inducing packet with 6 bits may be formed using $2^{\wedge}(6-1)-1=31$ transmission preparatory packets (6 bits) at maximum, or and may also be formed using 30 or 29 transmission preparatory packets, i.e., fewer than 31 transmission preparatory packets.

Referring to FIG. 3, when the transition inducing packet (E) is formed with the three different transmission preparatory packets (T) 000, 010, and 110 which are not complementary to each other among transmission preparatory packets (T) with a total of three bits, the two packets 011 and 100 which are obtained by excluding the six packets removed in ①, ②, and ③ from the eight different candidates for a transition inducing packet may be transition inducing packets.

Likewise, when a transmission preparatory packet has n bits, two transition inducing packets may be formed with $2^{\wedge}(n-1)-1$ different transmission preparatory packets which are not complementary to each other. In the case of a transmission preparatory packet having n bits, the number of different packets which may be transition inducing packets is $2^{\wedge}n$. The same packet as a transmission preparatory packet or packets which are complementary to each other cannot be transition inducing packets, and therefore two packets can be removed with one transmission preparatory packet. Thus, when transition inducing packets are formed with $2^{\wedge}(n-1)-1$ different transmission preparatory packets which are not complementary to each other, it is possible to obtain $2^{\wedge}n-2\times(2^{\wedge}(n-1)-1)=2$ transition inducing packets. This is a result obtained when the $2^{\wedge}(n-1)-1$ transmission preparatory packets are different from each other and are not complementary to each other, and two or more transition inducing packets can be obtained when transmission preparatory packets are identical to each other or complementary to each other.

In an embodiment, since the transition inducing packet (E) is transmitted together with the transition included data packet to be also used to restore data, the transition inducing packet should include a transition. Thus, it is necessary to perform a transition between at least two adjacent bits of the transition inducing packet (E). Thus, the transition inducing packet is formed in such a manner that transition is necessarily performed between predetermined adjacent bits of the transmitted transition inducing packets E1, E2 . . . . As an example, the transition inducing packet is formed so that transition is performed between an MSB and the adjacent bit. As another embodiment, the transition inducing packet is formed so that transition is performed between an LSB and the adjacent bit.

Figure 4:
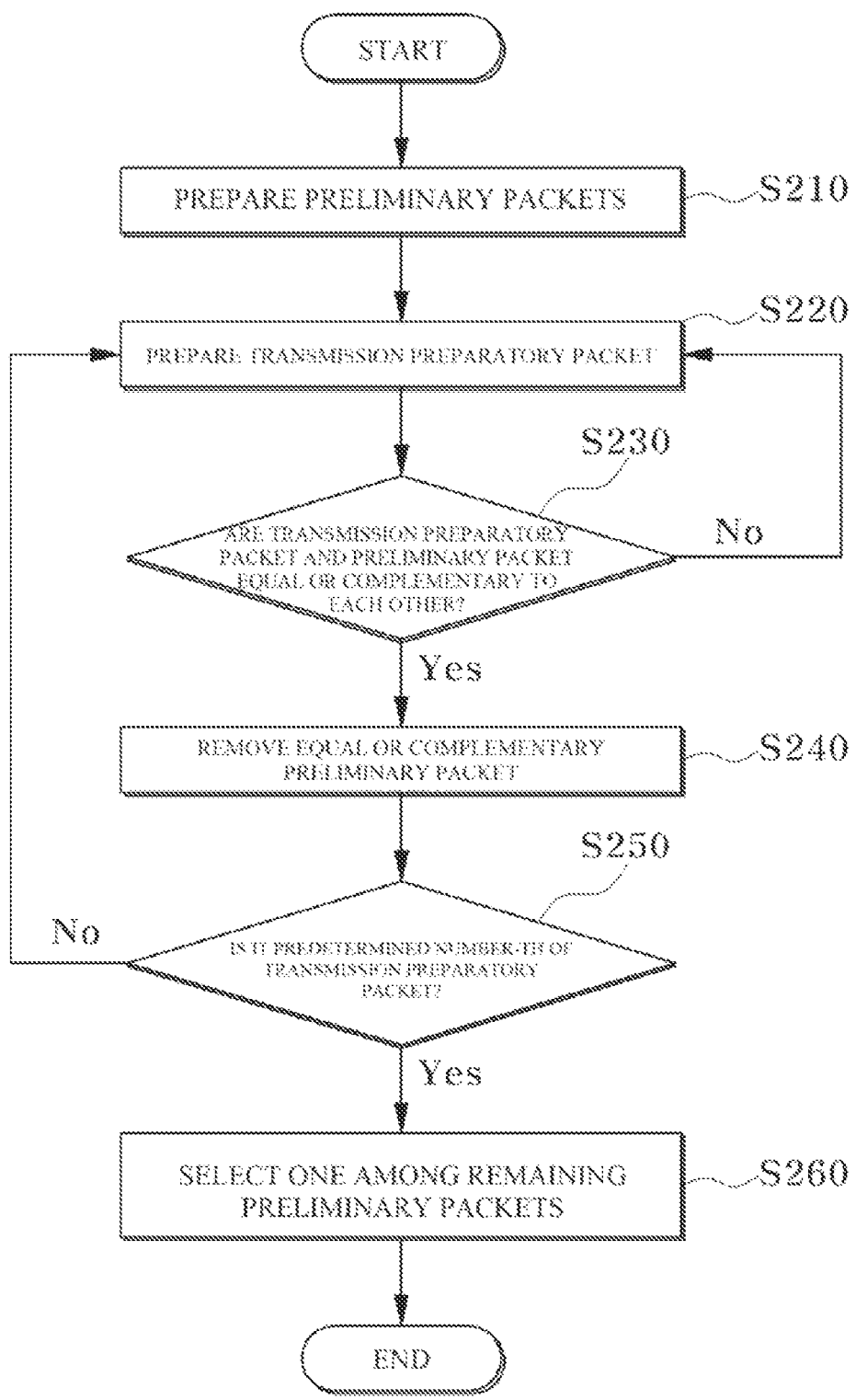
FIG. 4 is a schematic flowchart illustrating a method of forming a transition inducing packet according to an embodiment of the present invention.

A method of forming the transition inducing packet according to an embodiment of the present invention will be described with reference to FIG. 4. In operation S210, a preliminary packet having all data enabled with n bits is prepared. As an example, the number of preliminary packets enabled with 3 bits is 8 such as 000, 001, 010, 011 . . . and 111 as described above. As another example, when the transition inducing packet and the transition preparatory packet are 6 bits, the number of preliminary packets is 64 such as 000000, 000001, 000010 . . . 111111.

In operation S220, a transmission preparatory packet is prepared. As an embodiment, the transmission preparatory packet may be prepared by dividing pixel data (XD) to be transmitted by a predetermined number of bits, and corresponding transmission preparatory packets may be stored in a register. In operation 230, it is determined whether the prepared transmission preparatory packet and preliminary packet are equal or complementary to each other. In operation 240, the preliminary packet which is equal or complementary to the transmission preparatory packet is removed. This is because a transition cannot be formed in the operation result when a logical operation is performed on the preliminary packet which is equal or complementary to the transmission preparatory packet and the corresponding transmission preparatory packet.

Subsequently, in operation S250, whether the transition preparatory packet corresponds to a predetermined number is determined. As an example, in a case of the transmission preparatory packet with 6 bits as described above, one transition inducing packet can be formed using 30 transmission preparatory packets, and therefore whether the transition preparatory packet corresponds to the predetermined number is determined. However, obviously, the predetermined number should not exceed $2^{(n-1)}-1$. As an embodiment, the number of transmission preparatory packets is calculated before proceeding to the following operation. According to the present embodiment, there is no need to calculate the number of mutually different transmission preparatory packets which are prepared for forming the transition inducing packet, and therefore a configuration of a device for implementing this may be simplified. As another embodiment, the number of mutually different transmission preparatory packets is calculated before proceeding to the following operation. According to the present embodiment, since the number of mutually different transmission preparatory packets is calculated to form the transition inducing packet, the number of transition included data packets which can be transmitted together with one transition inducing packet in a transmission process later may be increased, and therefore data transmission efficiency may be improved.

In operation S260, one of the remaining preliminary packets is selected as the transition inducing packet to form the transition inducing packet. Consequently, the formed transition inducing packet is not equal or complementary to the predetermined number of transition preparatory packets. In an embodiment, when transition should be formed between an MSB and the adjacent bit of the transition inducing packet, the transition inducing packet is selected to match this. In another embodiment, when transition should be formed between an LSB and the adjacent bit, the transition inducing packet is selected to match this. In still another embodiment, when transition should be formed between any two adjacent bits, the transition inducing packet is selected to match this.

Figure 5:
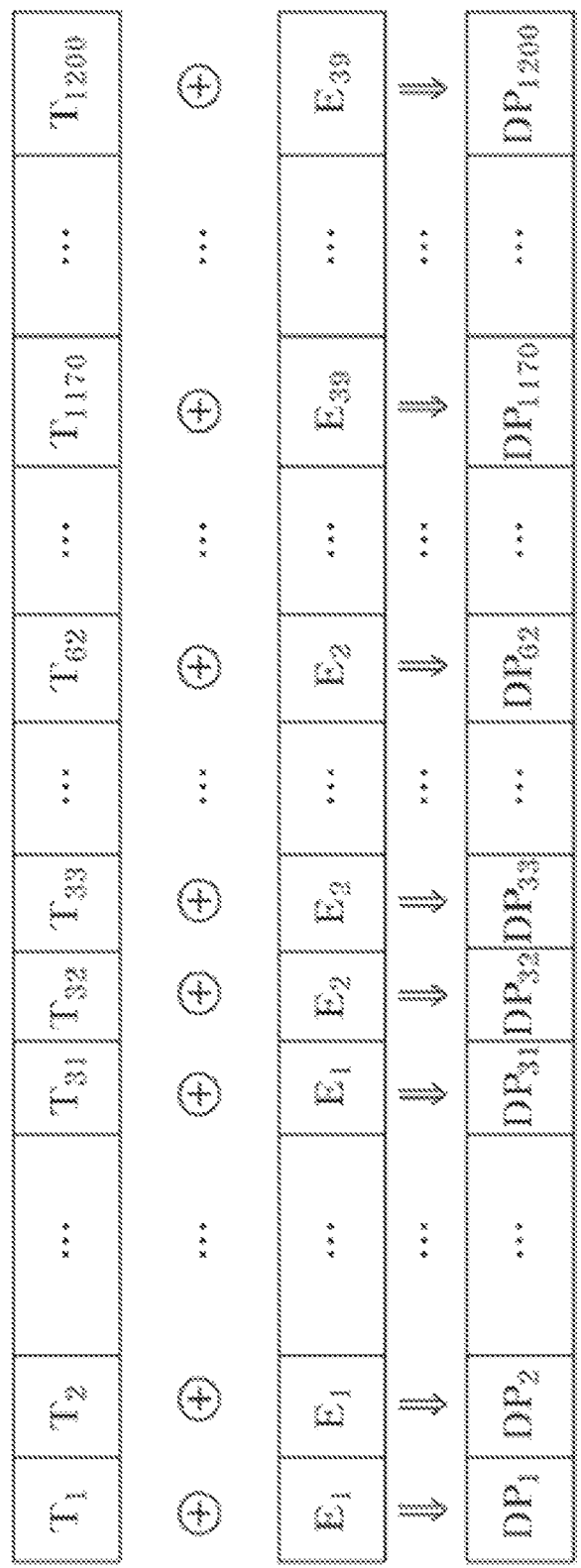
FIG. 5 is a schematic diagram illustrating a method of forming a transition included data packet.

Referring to FIGS. 1 and 5, in operation S300, transition included data packets are formed by performing a logical operation on the transmission preparatory packet (T) and the transition inducing packet (E). In an embodiment, an XOR operation is performed on respective corresponding bits of the transition preparatory packet (T) and the transition inducing packet (E). As described above, the transition preparatory packet (T) and the transition inducing packet (E) have the same number of bits. As an example, when the pixel data (XD) to be transmitted is 7200 bits and the transmission preparatory packet (T) and the transition inducing packet (E) are 6 bits, a logical operation is performed on one transition inducing packet with the transmission preparatory packet used in forming the corresponding transition inducing packet. As an example, when the number of transition preparatory packets used in forming one transition inducing packet with 6 bits is 31, the logical operation is performed on the one transition inducing packet and 31 transmission preparatory packets to form 31 data packets. Thus, by respectively performing the logical operation using the transition inducing packet E1 and the transmission preparatory packets T1 to T31, DP1, DP2 . . . and DP31 are formed, and by respectively performing the logical operation using the transition inducing packet E2 and the transmission preparatory packets T32 to T62, DP32 to DP 62 are formed. In this manner, by performing the logical operation on the transition inducing packet E39 and the transmission preparatory packets T1170 to T1200, DP 1170 to DP 1200 are formed.

As another example, although not shown, when the number of transmission preparatory packets used in forming one transition inducing packet with 6 bits is 30, 30 data packets are formed by performing the logical operation on one transition inducing packet and 30 transmission preparatory packets.

TABLE 1

| Transmission preparatory packet | Transition inducing packet (E) | Transition included data packet (DP) |
| --- | --- | --- |
| 010111 | 010011 | 000100 |
| 101101 |  | 111110 |

As an example, when a first transmission preparatory packet (T) and the transition inducing packet (E) are all 6 bits as shown in Table 1, the first transmission preparatory packet and the transition inducing packet are not equal or complementary to each other. In addition, it can be seen that transition from 0 to 1 or from 1 to 0 is in the transition included data packet (DP) that is the result of the logical operation. In the same manner, it can be seen that transition from 1 to 0 is in the data packet (DP) that is the result of the logical operation between a second transmission preparatory packet and the transition inducing packet.

Since at least one transition is necessarily included in the data packet (DP) that is the result of the XOR operation, a reception unit that receives the transition included data packet restores a clock using transition as will be described later. Thus, there is no need to form a separate clock signal line as in the related art, and therefore manufacturing costs of the display may be reduced. In addition, since a position in which transition is performed is not fixed within the data packet, transition may be uniformly distributed and positioned for each packet when transmitting a plurality of data packets. As a result, EMI is reduced. In addition, since a clock signal is restored and used in a reception terminal, clock skew that occurs when separately transmitting data and the clock signal to the clock signal line may not be generated.

As described above, it is possible to obtain at least two transition inducing packets, and the number of obtainable transition inducing packets increases with an increase in the number of transmission preparatory packets which are identical or complementary to each other among transmission preparatory packets used in the process of forming transition inducing packets. Also, since at least one data transition in data packets is obtained by performing a logical operation on the transition inducing packets and transmission preparatory packets, the number of data transitions in a data packet obtained from the same transmission preparatory packet is determined according to a selected transition inducing packet.

FIG. 12(A) is a diagram illustrating a data packet obtained when a transition inducing packet 100000 (E1) is selected to transmit 011000 as a transmission preparatory packet (T) a plurality of times, and FIG. 12(B) is a diagram illustrating a schematic form of a data packet obtained when a transition inducing packet 110010 (E2) is selected. Referring to FIG. 12(A), the data packet obtained by performing a logical operation on the transmission preparatory packet (T) and the transition inducing packet E1 is 111000, and it can be seen that one transition occurs in the data packet and one transition occurs between packets.

On the other hand, referring to FIG. 12(B), the data packet obtained by performing a logical operation on the transmission preparatory packet (T) and the transition inducing packet E2 is 101010, and it can be seen that five transitions occur in the data packet and one transition occurs between packets. Thus, it can be seen that, when the same transmission preparatory packet is transmitted, the number of data transitions in a transmitted data packet is determined according to a selection of a transition inducing packet.

In an embodiment, it is possible to reduce electromagnetic interference (EMI) by selecting a transition inducing packet capable of reducing the number of data transitions in a data packet. EMI occurs due to electromagnetic waves caused by a data transition, and increases as a transition periodically occurs in a data packet or the number of transitions in a data packet increases. Thus, it is possible to reduce EMI by reducing the number of data transitions.

Further, when there are many transitions in a data stream to be transmitted, power consumption required to form the transitions increases. Thus, to reduce EMI and power consumption, it is possible to select a transition inducing packet capable of reducing data transitions in a data packet.

In another embodiment, it is possible to increase the accuracy of clock restoration of the reception unit by selecting a transition inducing packet capable of increasing data transitions in a data packet. The data packet has at least one data transition therein, and the reception unit receives the data packet including the data transition and restores a clock using the transition. When there are a plurality of data transitions in the data packet, it is possible to improve the accuracy of clock restoration using the transitions. Thus, to improve the accuracy of clock restoration of the reception unit, it is possible to select a transition inducing packet capable of increasing data transitions in a data packet.

In another embodiment, the accuracy of clock restoration may be low upon initial driving of a data transmission apparatus and reception apparatus. For example, when a data transmission apparatus according to the present embodiment and a data reception apparatus which will be described later are implemented in an image display apparatus which transmits and receives data in units of frames, the accuracy of clock restoration of the data reception apparatus may be low until several initial frames to tens of initial frames after the image display apparatus is initially operated.

Thus, a number of transition included data packets corresponding to a predetermined number of packets are formed by performing a logical operation using a transition inducing packet capable of increasing transitions in a data packet, and then data packets are formed using a transition inducing packet capable of reducing transitions in a data packet and transmitted, so that EMI and/or power consumption can be reduced.

In an embodiment, the logical operation between the transmission preparatory packets and the transition inducing packet is performed serially. The transition included data packets (DP) are formed by aligning the result of the serially performed logical operation using an MSB to an LSB. Another embodiment, the logical operation between the transmission preparatory packets (T) and the transition inducing packet is performed in parallel. The results of the logical operation performed in parallel are serialized, and then the serialized results are aligned to match corresponding bits to form data packets (DP).

Figure 6:
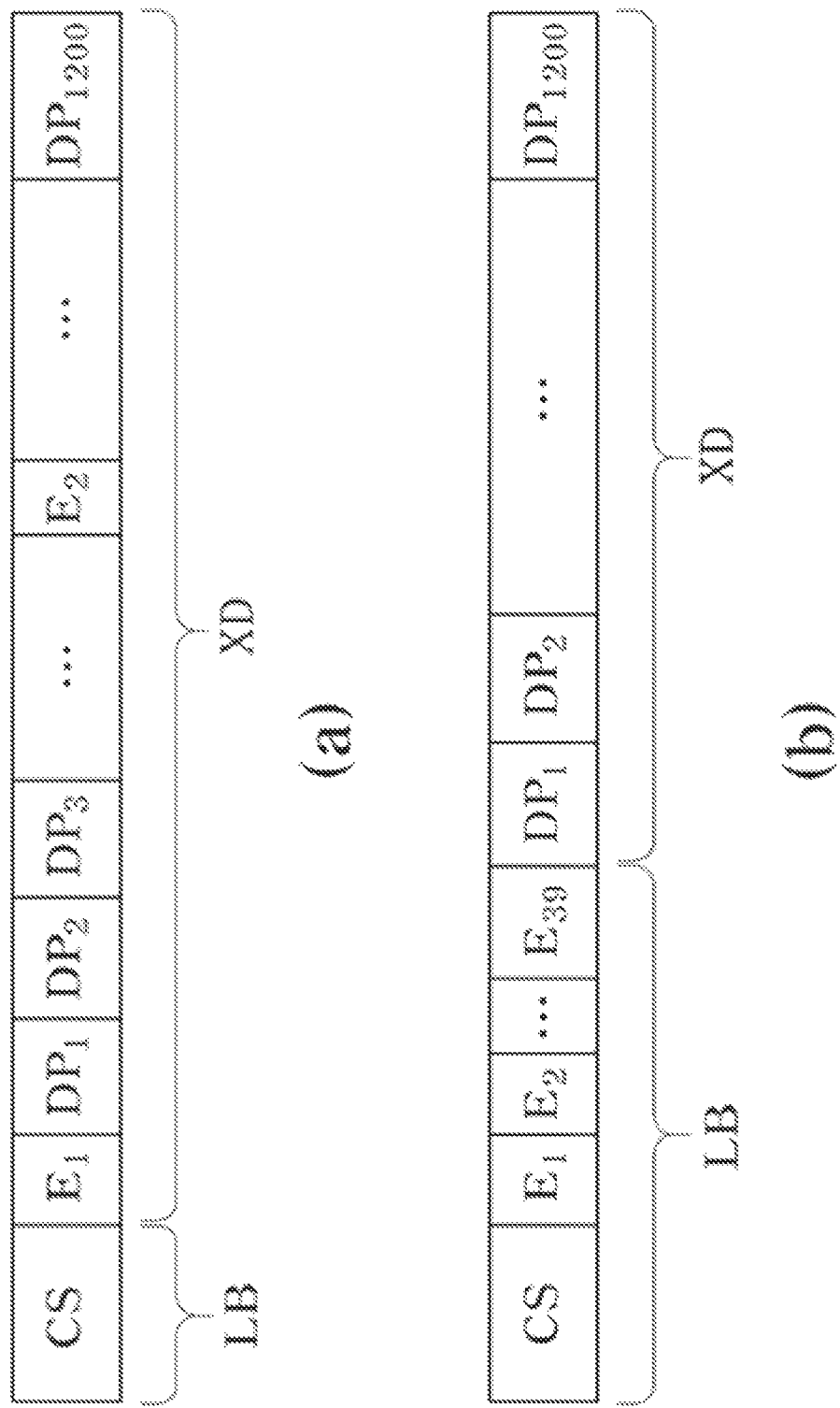
FIG. 6 is a schematic diagram illustrating a method of transmitting a transition inducing packet and transition included data packets.

FIG. 6 is a schematic diagram illustrating a method of transmitting a transition inducing packet and transition included data packets. Referring to FIGS. 1 and 6, in operation S400, the transition included data packets and the transition inducing packet are transmitted. As an embodiment, when 31 transmission preparatory packets are used in order to form one transition inducing packet (E) with 6 bits, 1200 transition included data packets and 39 transition inducing packets should be transmitted in order to transmit data with 7200 bits. As another embodiment, when 30 transmission preparatory packets are used in order to form one transition inducing packet (E) with 6 bits, 1200 transition included data packets and 40 transition inducing packets should be transmitted in order to transmit data with 7200 bits.

As an embodiment in which the transition inducing packets and transition included data packets are transmitted, the transition included data packets and the transition inducing packet are transmitted in a pixel data (XD) transmission region. As shown in FIG. 6A, before transmitting the transition included data packets, the transition inducing packet is transmitted. According to the present embodiment, since the transition inducing packet is transmitted together within a data transmission interval, transmission efficiency may be slightly reduced, but a configuration of a circuit that restores data from the data packets may be simplified. In another embodiment, a configuration in which transition inducing packets to be transmitted to a single channel are all collected and transmitted, and the transition included data packets are transmitted to a pixel data (XD) transmission region may be possible. As an example, a configuration in which the transition inducing packets are all collected and transmitted with control signals (CS) within a line blank (LB) interval shown in FIG. 6B may be possible. However, in the example shown in FIG. 6B, one transition inducing packet (E) and 31 transition included data packets (DP) are transmitted, and therefore, obviously, the number of data packets (for example, 30) that does not exceed 31 per one transition inducing packet (E) may be transmitted together. According to the present embodiment, only pixel data is transmitted to the pixel data transmission region, and therefore transmission efficiency approaches 100%. As another embodiment, although not shown, a configuration in which pixel data (XD) of any one channel is transmitted, and then a transition inducing packet of a corresponding channel or a transition inducing packet of a next channel are all collected and transmitted prior to a pixel data (XD) transmission interval of the next channel may be possible.

When the number of bits of the transition inducing packet (E) and the transmission preparatory packets are increased, a probability of occurrence of error at the time of clock restoration in a process of restoring the clock using a transition included in the data packet transmitted to a data driver is increased, and therefore complexity and accuracy of the clock restoration circuit should be increased. However, the number of transition inducing packets transmitted to the data driver is reduced, and therefore transmission efficiency is improved.

As described above, at least two transition inducing packets can be simultaneously formed, and the number of simultaneously formed transition inducing packets increases when transmission preparatory packets which are identical or complementary to each other are included. For example, transmission preparatory packets with a total of four bits are 0001 (T1), 0100 (T2), 0110 (T3), 1001 (T4), 1100 (T5), 1100 (T6), and 1101 (T7). The transmission preparatory packets T5 and T6 are 1100, that is, identical to each other. The transmission preparatory packets T3 and T4 are 0110 and 1001, which are complementary to each other. It is assumed that a packet bundle including the transmission preparatory packets T1 to T7 is repeatedly transmitted for a predetermined time period.

When transition inducing packets are formed with T1 to T7, it is possible to obtain six transition inducing packets including 0000 (E1), 0101 (E2), 0111 (E3), 1000 (E4), 1010 (E5), and 1111 (E6). Using a plurality of transition inducing packets for the repeatedly provided transmission preparatory packets T1 to T7, it is possible to form different data packets.

For example, by performing a logical operation on initially provided transmission preparatory packets T1 to T7 and the transition inducing packet E1, it is possible to form transition included data packets DPa1 to DPa7, and by performing the logical operation on next provided transmission preparatory packets and the transition inducing packet E2, it is possible to form transition included data packets DPb1 to DPb7. Likewise, even after DPf1 to DPf7 are formed by performing the logical operation using the transition inducing packet E6, it is possible to form data packets by performing the logical operation using E1 to E6 when T1 to T7 are continuously provided.

The following table shows examples of DPa1 to DPa7 which are data packets obtained by performing the logical operation on the transmission preparatory packet T1 to T7 and E1, and DPb1 to DPb7 which are data packets obtained by performing the logical operation on the same transmission preparatory packets T1 to T7 and E2.

TABLE 2

| Transmission preparatory packet | Data packet (DPa) | Data packet (DPb) |
|---|---|---|
| 0001 | 0001 (DPa1) | 0100 (DPb1) |
| 0100 | 0100 (DPa2) | 0001 (DPb2) |
| 0110 | 0110 (DPa3) | 0011 (DPb3) |
| 1001 | 1001 (DPa4) | 1100 (DPb4) |
| 1100 | 1100 (DPa5) | 1001 (DPb5) |
| 1100 | 1100 (DPa6) | 1001 (DPb6) |
| 1101 | 1101 (DPa7) | 1000 (DPb7) |

As shown in Table 2 above, it can be seen that, while data of the transmission preparatory packets T1 to T7 does not change, values of transmission preparatory packets obtained through a logical operation with transition inducing packets change.

Figure 13:
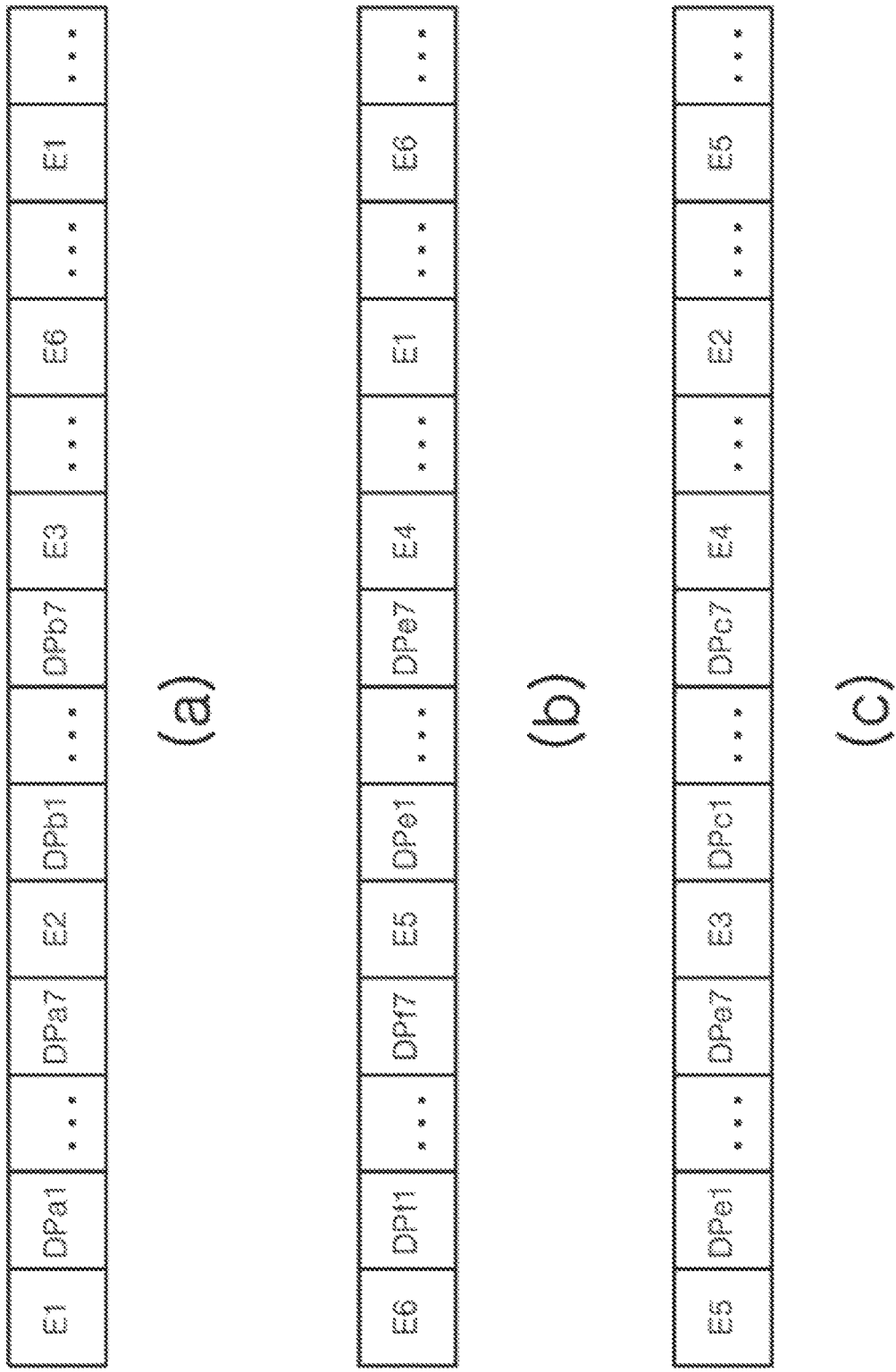
FIG. 13 is a diagram schematically illustrating transmission of transition included data packets obtained by performing an operation on data of the same transmission preparatory packet and different transition inducing packets.

FIG. 13 is a diagram schematically illustrating transmission of transition inducing packets E1 to E7 and transition included data packets DPa1 to DPf7 according to the present embodiment. Although the same data is restored in a reception terminal, when only the data packets DPa1 to DPa7 and the transmission preparatory packet E1 are repeatedly transmitted, a position at which a transition occurs in a data stream to be transmitted is fixed, and therefore EMI may be caused.

Thus, like transmission of the transmission preparatory packet E1 having the smallest value and the transition included data packets DPa1 to DPa7 formed using E1 and transmission of E2 having the second smallest value and the transition included data packets DPb1 to DPb7 formed using E2 as shown in FIG. 13(a), it is possible to sequentially transmit a transmission preparatory packet having the smallest value and transition included data packets formed using the transmission preparatory packet. Also, even after transmission of E7 and transition included data packets obtained using E7, the transmission preparatory packets T1 to T7 may be retransmitted in the same sequence.

FIG. 13(b) is a diagram illustrating transmission of transition inducing packets and transition included data packets formed using the transition inducing packets in order of decreasing transition inducing packet value. Referring to FIG. 13(b), after the transmission preparatory packet E7 having the largest value and the transition included data packets DPf1 to DPf7 formed using E7 are transmitted, a transmission preparatory packet having the second largest value and transition included data packets formed using the transmission preparatory packet may be transmitted in sequence. When it is required to transmit the transmission preparatory packets T1 to T7 even after transmission of E1 having the smallest value and transition included data packets formed using E1, the transmission preparatory packets T1 to T7 may be retransmitted in the same sequence.

FIG. 13(c) is a diagram illustrating random transmission of transition inducing packets and transition included data packets formed using the transition inducing packets irrespective of values of the transition inducing packets. As shown in FIG. 13(c), one random transition inducing packet among E1 to E6 and transition included data packets formed using the transition inducing packet may be transmitted, and then retransmission may be performed in the corresponding sequence or the random transmission may be continuously performed. According to embodiments illustrated in the respective diagrams of FIG. 13, it is possible to uniformly distribute positions of transitions in a data stream in which data packets are transmitted, so that influence of EMI can be reduced.

When it is required to transmit data included in the same transmission preparatory packet, it is possible to form transition inducing packets and then continuously transmit only data packets obtained through a logical operation with any one transition inducing packet and the transition inducing packet. According to the present embodiment, it is possible to omit a logical operation process with a new transition inducing packet, and therefore power consumption can be reduced.

As another embodiment, data packets may be formed using a transition inducing packet which causes minimum transitions among a plurality of transition inducing packets and transmitted as described above. According to the present embodiment, it is possible to reduce transitions in a data stream, and therefore EMI and power consumption can be reduced.

As still another embodiment, data packets formed using a transition inducing packet which causes as many transitions as possible among a plurality of transition inducing packets may be transmitted as described above. According to the present embodiment, it is possible to readily restore a clock on a data transmission side.

Figure 14:
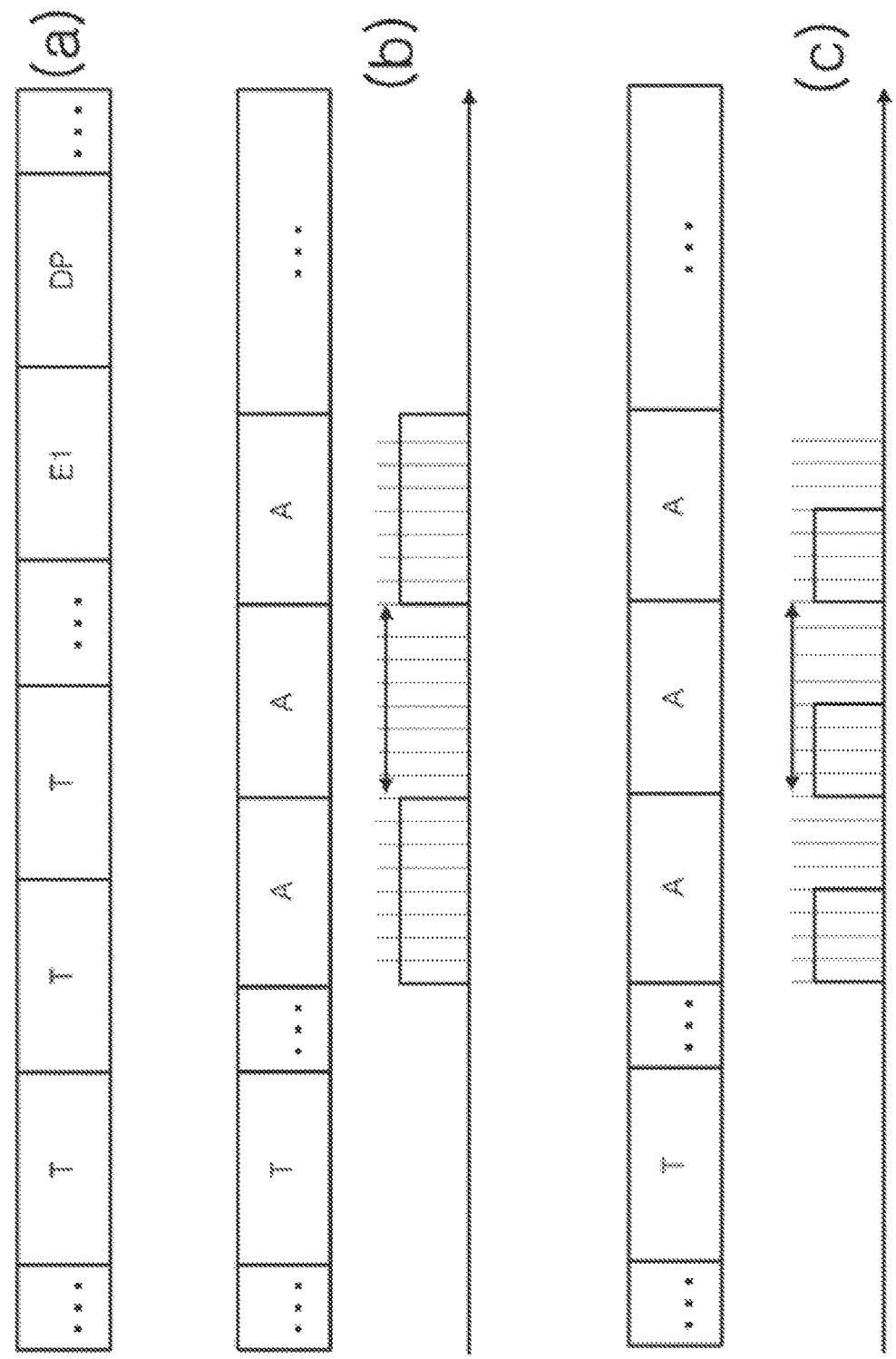
FIG. 14 is a diagram schematically illustrating transmission of a tuning signal and an align packet according to the present embodiment.

In an embodiment, before operation S400 is performed, a predetermined tuning signal (TS, see FIG. 10) is transmitted, so that a phase frequency detector (see PFD in FIG. 10) of a frequency tracking loop (see FTL in FIG. 10) included in a reception side tracks a clock frequency and a phase of a clock. FIG. 14 is a diagram schematically illustrating transmission of a tuning signal and an align packet according to the present embodiment. Referring to FIG. 14(a), when a transition inducing packet, a transition included data packet, and a tuning signal all have six bits, the tuning signal of 111000 causes a transition in the middle of a packet and between packets, thereby causing a phase frequency detector (see PFD in FIG. 10) of a frequency tracking loop (see FTL in FIG. 10) to readily track a clock frequency and a phase of a clock.

For example, the tuning signal may be a packet repeatedly including several bits of 1 and 0, such as 101010 . . . , 11001100 . . . , and 111000111 . . . , so that a phase tracking loop (see PTL in FIG. 10) and/or a frequency tracking loop (see FTL in FIG. 10) can readily track a clock. In another example, the tuning signal may be 11111111, 00000000, etc. in which packets filled with 1s and packets filled with 0s alternate.

FIG. 14(b) is a diagram schematically illustrating transmission of a tuning signal and then transmission of align packets (A). Align packets are for distinguishing between a transition inducing packet and transition included data packets in a received data stream after frequency tracking is finished, and may include, for example, packets in which all designated bits are filled with 1s and packets in which all designated bits are filled with 0s as shown in the lower diagram of FIG. 14(b). Thus, it is possible to know the number of bits in one packet from one of the align packets, and it can be seen that one packet includes eight bits as shown in the drawing.

FIG. 14(c) is a diagram illustrating another example of align packets, in each of which 4 bits of 1 and 4 bits of 0 alternate. It is possible to know the number of bits included in one packet from a length of a state of logic 1 or logic 0 in an align packet. Although not shown in the drawing, an align packet may be the same as a tuning signal (TS), and may be used to perform frequency tracking and phase locking as will be described later.

Thus, the reception unit can distinguish respective packets from each other in a received data stream using the illustrated align packets, and distinguish between a transition inducing packet and transition included data packets accordingly. Likewise, after a plurality of transition inducing packets are transmitted in a line blank period, align packets are inserted between a plurality of data packets based on the respective transition inducing packets, and the data packets and the align packets are transmitted, so that the respective transition inducing packets and the data packets corresponding to the transition inducing packets can be distinguished from each other.

Figure 7:
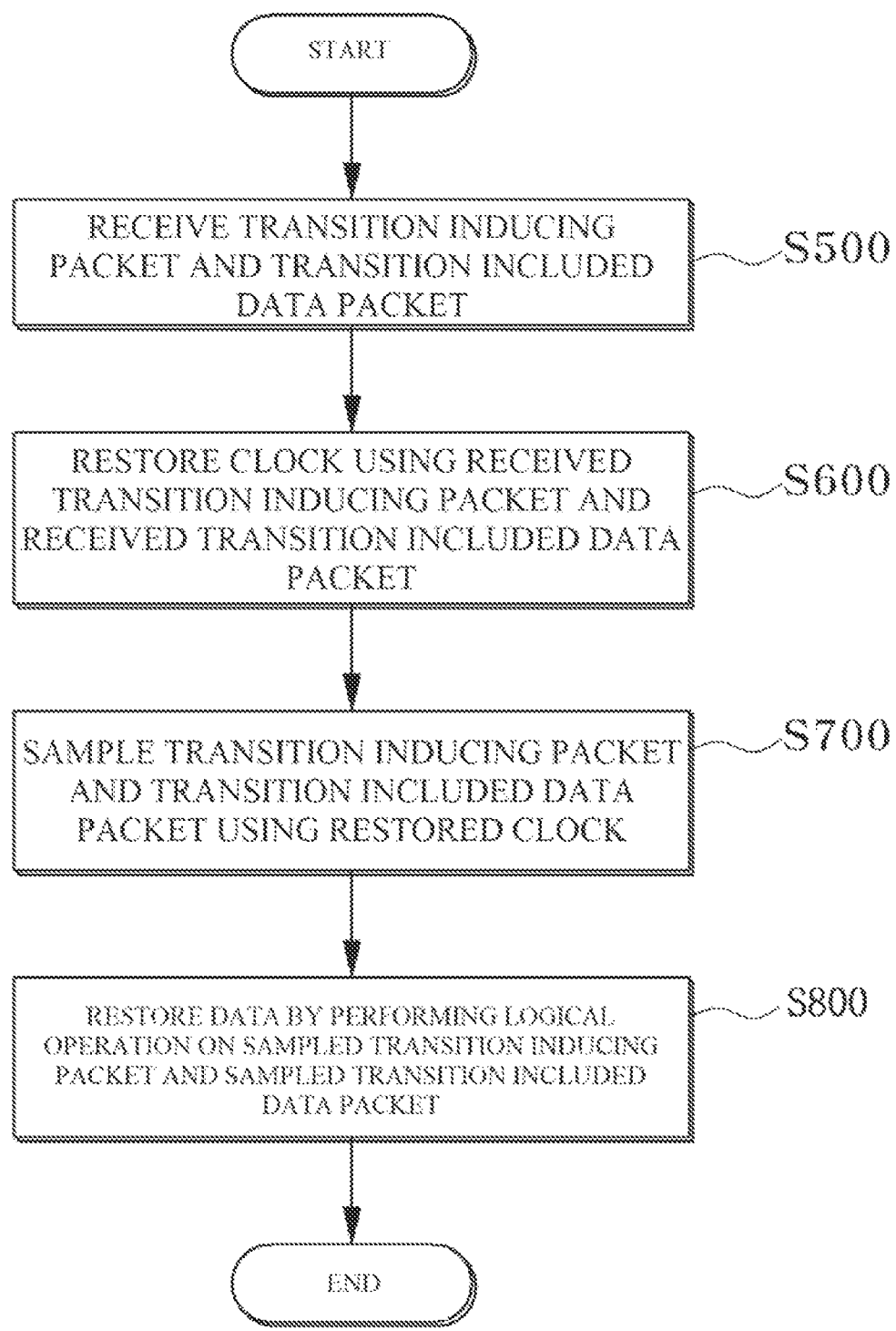
FIG. 7 is a schematic flowchart illustrating a data restoration method according to an embodiment of the present invention.

Hereinafter, a data restoration method according to an embodiment of the present invention will be described with reference to the accompanying drawings. FIG. 7 is a schematic flowchart illustrating a data restoration method according to an embodiment of the present invention. Referring to FIG. 1, in operation S500, a transition inducing packet (E) and a transition included data packet are received. Between adjacent bits of the data packet, there is at least one transition from 0 to 1 or from 1 to 0 as described above.

In an embodiment, before receiving a transition inducing packet (E) and transition included data packets, the reception unit receives a tuning signal (see FIG. 14(a)) as described above, thereby causing a phase tracking loop (see PTL in FIG. 10) and/or a frequency tracking loop (see FTL in FIG. 10) to track a clock. As described above, the tuning signal may be, for example, a packet repeatedly including several bits of 1 and 0, such as 101010 . . . , 11001100 . . . , and 111000111 . . . , so that a phase tracking loop (see PTL in FIG. 10) can readily track a frequency of the clock, or may be, in another example, 11111111, 00000000, etc. in which packets filled with 1s and packets filled with 0s alternate. After frequency tracking, the tuning signal is provided to the phase tracking loop (see FTL in FIG. 10) to track a clock phase, and the phase of the clock is locked to restore the clock.

Also, after finishing clock tracking, the reception unit receives an align packet (A) to distinguish between a transition inducing packet and a transition included data packet. Embodiments in which a transition inducing packet and a transition included data packet are distinguished from each other using an align packet (A) have been described as examples in FIGS. 14(b) and 14(c). According to an embodiment that is not illustrated, an align packet has a training signal and a number of bits, and therefore it is possible to distinguish between packets using a tuning signal as an align packet after frequency tracking and phase locking.

The reception unit can distinguish respective packets from each other in the data stream by receiving the align packet, and distinguish between a transition inducing packet and transition included data packets accordingly. Likewise, after a plurality of transition inducing packets are transmitted in a line blank period, align packets are inserted between a plurality of data packets based on the respective transition inducing packets, and the data packets and the align packets are transmitted, so that the respective transition inducing packets and the data packets corresponding to the transition inducing packets can be distinguished from each other.

Figure 8:
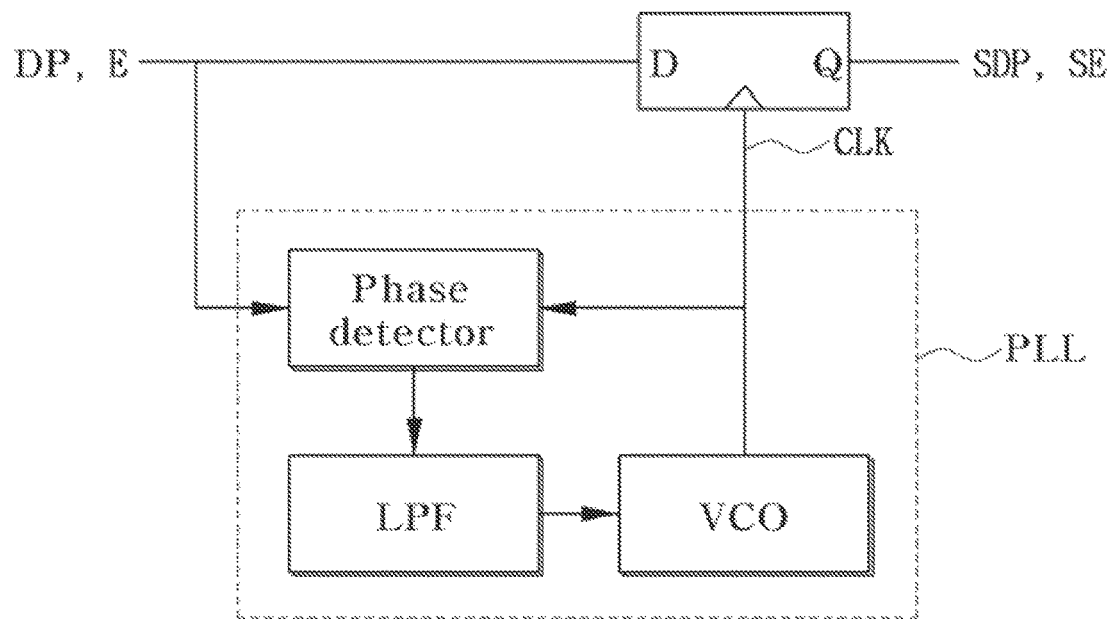
FIG. 8 is a schematic diagram illustrating a data restoration method according to an embodiment of the present invention.

FIG. 8 is a diagram illustrating an example of a configuration in which a clock signal can be restored using the received transition inducing packet (E) and the transition included data packet (DP). Referring to FIGS. 7 and 8, in operation 600, a clock is restored using the received transition inducing packet and the transition included data packet. In an embodiment, as shown in FIG. 8, the clock may be restored using a structure of a phase locked loop (PLL). When inputting the received transition included data packet (DP) or the transition inducing packet (E) and output signals of a voltage controlled oscillator (VCO) to a phase detector, the phase detector detects a phase difference between signals output from the VCO and a transition of the data packet (DP) or a phase difference between signals output from the VCO and a transition of the transition inducing packet (E). The phase detector (PD) simultaneously outputs high-band signals and phase difference signals, and therefore only the phase difference signals are obtained using a low pass filter (LPF) and an oscillation frequency is controlled by inputting the obtained phase difference signals to the VCO, thereby obtaining restored clock signals (RCLK).

In the shown configuration, obviously, a PLL may be used, or a delay locked loop (DLL) using a voltage controlled delay line (VCDL) may be used. When using the DLL, an output frequency of the PLL using the local oscillator cannot exactly coincide with a transmission frequency of the transition included data packet due to the configuration, and a minute error may occur. When such minute errors accumulate, an error may occur while being deviated from a control range of the VCDL. Thus, in order to compensate for this, a multi-phase clock generated in the PLL may be used in the VCDL as an input, or an error may be prevented using a phase interpolator.

Figure 9:
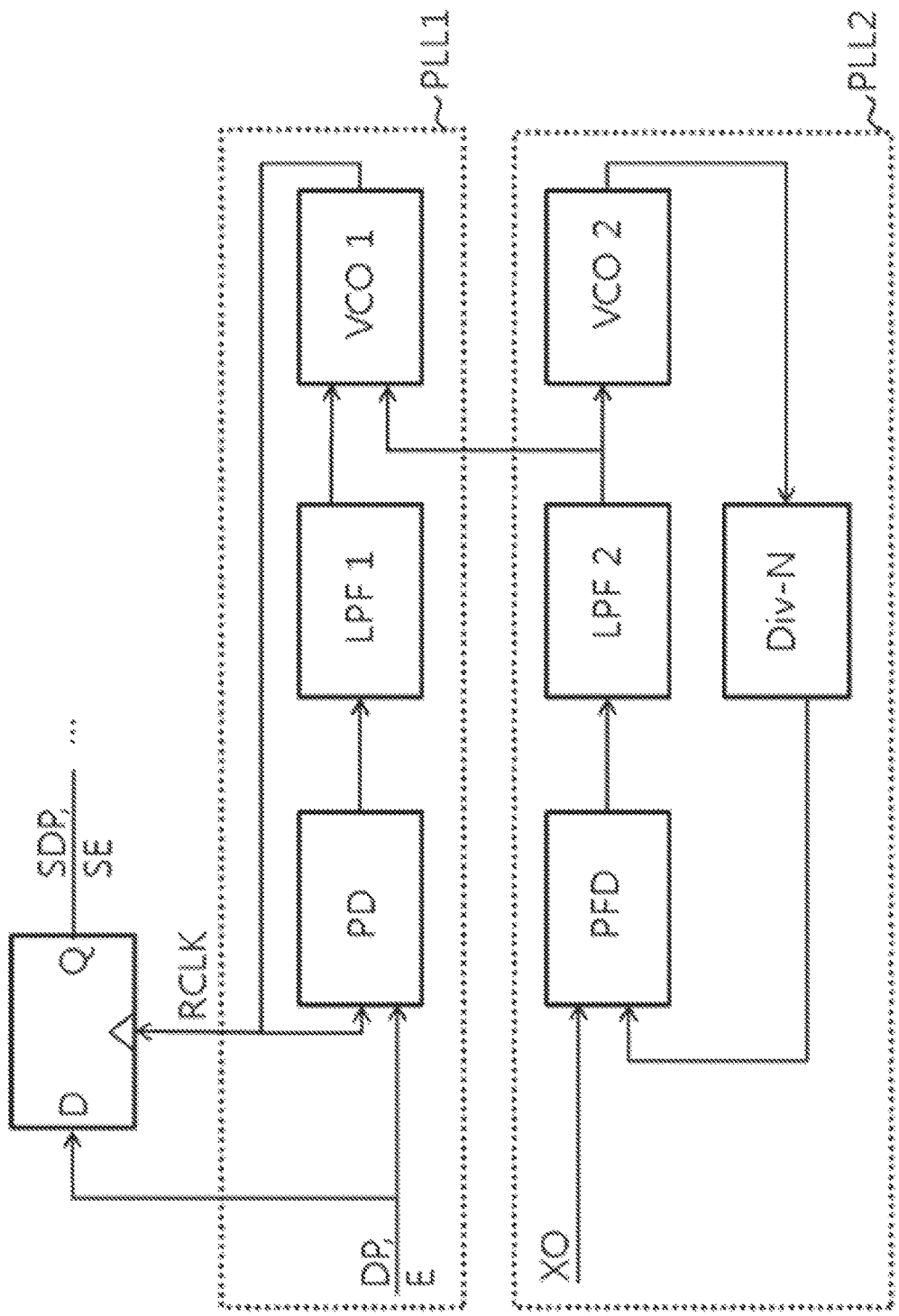
FIGS. 9 and 10 are schematic diagrams illustrating a method of tracking a clock according to an embodiment of the present invention.

In an embodiment, the data restoration method may further include tracking the clock before restoring the clock. FIG. 9 is a diagram showing an example of a configuration in which a clock is restored by tracking the clock. Referring to FIG. 9, the configuration of tracking the clock includes a second phase locked loop (PLL 2) that receives output signals (XO) of the local oscillator for outputting signals with a predetermined frequency. The PLL2 includes a phase frequency detector (PFD), an LPF2, and a VCO2, and further includes a frequency divider (Div-N). The PFD detects a frequency difference or a phase difference between the output signals (XO) of the local oscillator and signals output by the VCO 2. The signals output by the PFD include high-band signals regardless of operations of a circuit in addition to phase difference signals, and therefore only frequency difference and phase difference signals are obtained using the LPF2. The phase difference signals output by the LPF2 are input to the VCO2, and then frequency-division is performed on the input signals using the Div-N, thereby tracking a frequency of the clock.

The signals output from the LPF1 are input to the first VCO of the PLL1 for detecting a phase difference to sample data. That is, coarse tuning of clock frequency tracking is performed using the PLL2, and then fine tuning of clock phase tracking is performed using the PLL1 to restore the clock.

When the transition inducing packet (E) and the transition included data packet (DP) are input to a D flip-flop and the restored RCLK is input, the transition inducing packet and the transition included data packet are sampled to obtain the transition inducing packet and the transition included data packet which are synchronized with the transmitted clock signal. In the present embodiment, the D flip-flop is used, but sampling may be performed using a D latch, and other equivalent configurations may be possible.

Figure 10:
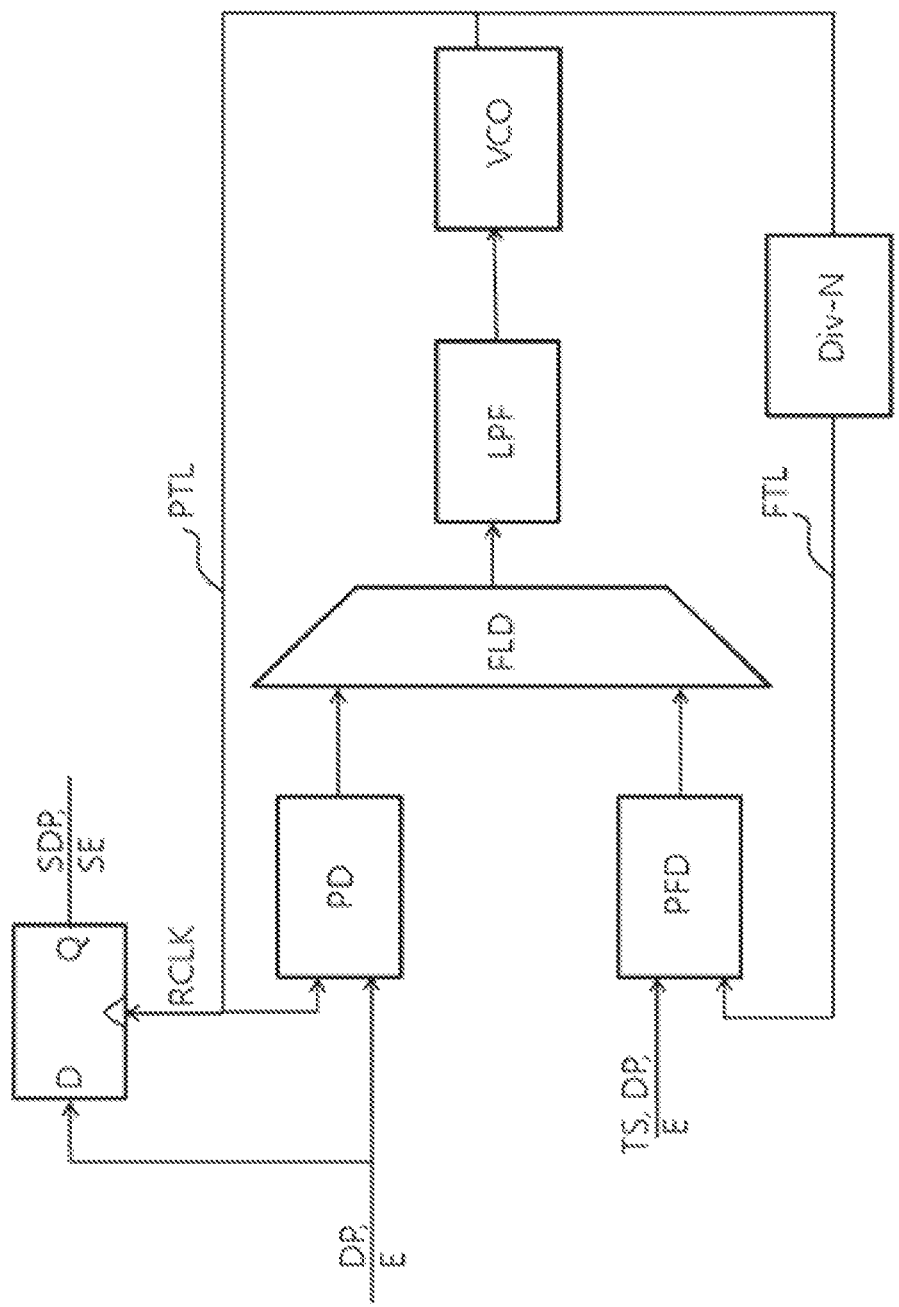

FIG. 10 is a block diagram illustrating another embodiment of a configuration of tracking the clock. When the local oscillator is not used, a double loop structure which is divided into a frequency tracking loop (FTL) and a phase tracking loop (PTL) is formed, and therefore the clock signal may be restored in the similar manner to the above embodiment. In an initial coarse tuning operation, tuning signals (TS) in which transition is performed at regular intervals are input to the phase frequency detector. In a state in which a frequency is not locked, a frequency lock detector (FLD) may connect the output to an LPF to lock the frequency. After the frequency is locked, fine tuning is performed to restore the clock. In the fine tuning process, when inputting the transition inducing packet (E) and the transition included data packet (DP) to the phase detector (PD), an FLD may connect the output of the phase detector (PD) to the LPF and the LPF may control the VCO using the phase difference signal output by the LPF to thereby restore the clock. That is, in a coarse tuning process, a clock frequency is locked by operating an FTL, and the PTL is operated when the frequency is locked, so that the clock phase is locked to restore the clock. In this manner, the transition inducing packet (E) and the transition included data packet (DP) are sampled using the restored clock (RCLK), thereby forming the sampled transition inducing packet (SE) and the sampled transition included data packet (SDP) which are synchronized with the clock signal.

Figure 11:
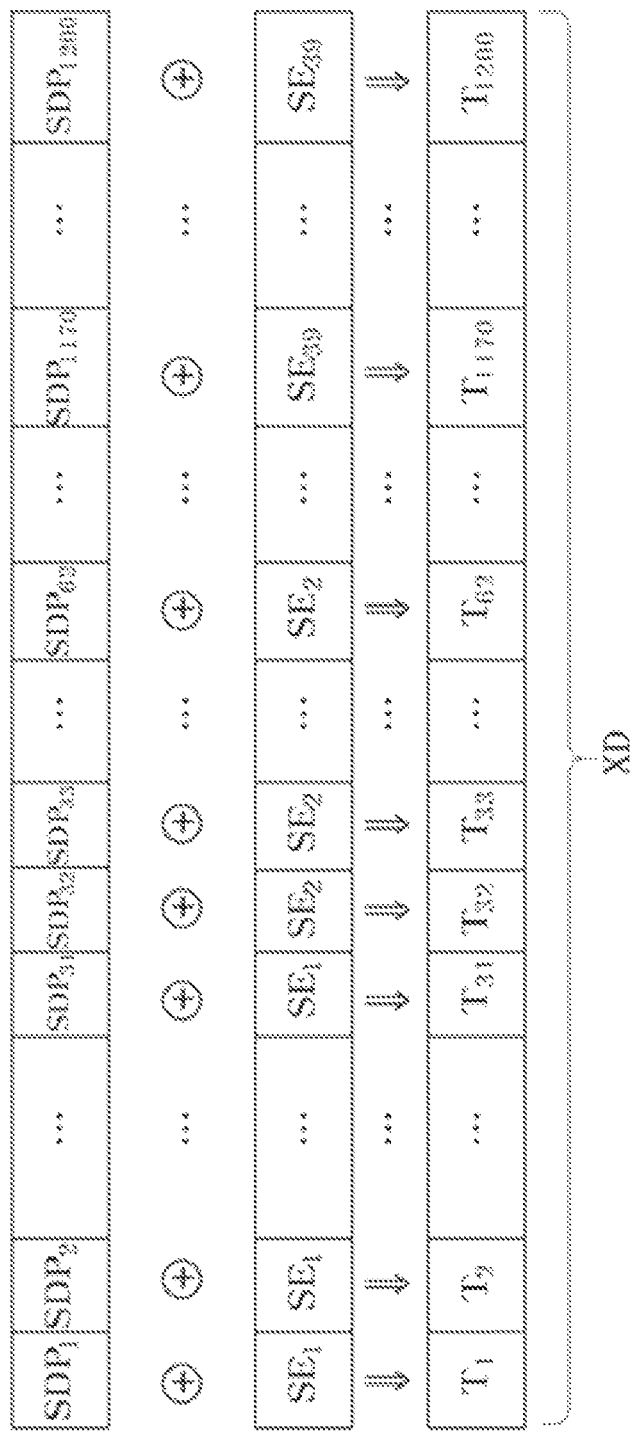
FIG. 11 is a schematic diagram illustrating a configuration of sampling pixel data from a transition included data packet.

FIG. 11 is a schematic diagram illustrating a process for restoring pixel data (XD) by performing a logical operation on the sampled transition inducing packet (SE) and the sampled transition included data packet (SDP). Referring to FIGS. 7 and 11, in operation S800, the logical operation is performed using the sampled transition included data packet and the sampled transition inducing packet to restore data. In an embodiment, the sampled transition inducing packet (SE) may be utilized as a seed for restoring the pixel data (XD) as described. This is based on the fact that an operation result (C) obtained by performing an XOR operation on binary data A and other binary data B and A can be obtained by performing the XOR operation with the binary data B with C. The sampled data packet (DP) is the result obtained by performing the XOR operation on the transmission preparatory packet (T) obtained by dividing data to be transmitted by a predetermined number of bits and the transition inducing packet (E) having the same number of bits, and therefore data of a corresponding part may be restored when performing the XOR operation on the sampled transition included data packet (SDP) and the sampled transition inducing packet (SE). That is, when performing a logical operation using SE1 and SDP1, T1 may be obtained. In the same manner, when performing the logical operation using SE1 and SDP2, T2 may be obtained. Thus, when performing the logical operation between the transition inducing packet and the data packets, the pixel data (XD) may be restored.

In an embodiment, referring to FIG. 6B, transition inducing packets E1, E2, E3 . . . and E39 of a corresponding line are sequentially transmitted in the line blank interval (LB), and transition included data packets DP1, DP2, DP3 . . . and DP1200 are sequentially transmitted in a pixel data transmission interval (XD). A reception end samples and stores the transition inducing packets E1, E2, E3 . . . and E39 sequentially transmitted during the LB interval using the restored clock (CLK), and then restores the pixel data by performing an XOR operation with the sequentially transmitted data packets using the stored transition inducing packets SE1, SE2, SE3 . . . and SE39. In this manner, all of the pixel data (XD) may be restored.

In another embodiment, referring to FIG. 6A, after the line blank (LB) interval, an initial transition inducing packet (E1) is received. Next, the sequentially received transition included data packets DP1, DP2 . . . and DP31 and the transition inducing packet (E1) are sampled, and then the logical operation is performed, thereby restoring the pixel data. Next, the following transition inducing packet (E2) is received, data packets DP32 . . . and DP62 sequentially received using the transition inducing packet (E2) are sampled, and then the logical operation is performed, thereby restoring the pixel data of the following region. Thus, according to the present embodiment, all of the pixel data may be restored.

As an embodiment in which the pixel data is restored, the sampled transition inducing packet (SE) and the sampled transition included data packet (SDP) are deserialized, and then the logical operation is performed bit-wise, thereby obtaining the pixel data synchronized with the transmission clock. In this manner, after deserializing, the bit-wise logical operation is performed, thereby achieving a high operation speed. The logical operation in this operation may be implemented in a software manner, and obviously implemented in a hardware manner. Next, the synchronized pixel data is processed by a desired number of bits, and then transmitted to a corresponding scan driver, thereby driving a display.

In the above-described communication method, an example of data communication between a timing controller and a data driver in an information display device has been described, but this is merely for clear and concise description, and not intended to limit the scope of the present invention. By changing the technical idea of the present invention by the skilled person, the present invention is obviously used in data communication between any one device and another device.

As described above, according to the embodiments of the present invention, data may be transmitted with high efficiency, and the transmitted data may be restored. According to the embodiments of the present invention, a position in which transition is performed is uniformly distributed without being locked in transition included data packets to be transmitted, and therefore effects due to EMI may be reduced. According to the embodiment of the present invention, data may be restored using the clock restored in the reception terminal, and therefore problems such as clock skew and jitter may be overcome.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A data transmission method between circuitries, the method comprising:
   forming, by a first circuitry, a plurality of transmission preparatory packets by dividing data to be transmitted by a predetermined number (n) of bits;
   forming, by the first circuitry, a plurality of transition inducing packets having the predetermined number (n) of bits, different from the transmission preparatory packets, and not complementary to the transmission preparatory packets; and
   forming, by the first circuitry, transition included data packets by performing a logical operation on the transition inducing packets and the respective transmission preparatory packets,
   transmitting the transition included data packets and the different transition inducing packets from the first circuitry to a second circuitry,
   wherein the forming of the transition included data packets comprises:
   forming the transition included data packets by performing the logical operation on periodically repeated packet bundles and different transition inducing packets.

2. The data transmission method of claim 1, wherein the forming of the transition included data packets comprises:
   forming transition included data packets by performing the logical operation on any one transition inducing packet and any one of the periodically repeated packet bundles; and
   forming transition included data packets by performing the logical operation on another transition inducing packet and another one of the periodically repeated packet bundles.

3. The data transmission method of claim 1, wherein the performing of the logical operation on the periodically repeated packet bundles and the different transition inducing packets comprises:
   sequentially selecting any one of the plurality of transition inducing packets; and
   forming transition included data packets by performing the logical operation on the selected one transition inducing packet and any one of the periodically repeated packet bundles.

4. The data transmission method of claim 1, wherein the performing of the logical operation on the periodically repeated packet bundles and the different transition inducing packets comprises:
   randomly selecting any one of the plurality of transition inducing packets; and
   forming transition included data packets by performing the logical operation on the selected one transition inducing packet and any one of the periodically repeated packet bundles.

5. The data transmission method of claim 1, wherein the first circuitry includes a timing controller of a display device and the second circuitry includes a data driver of the display device.

6. A data transmission method between circuitries, the method comprising:
   forming, by a first circuitry, a plurality of transmission preparatory packets by dividing data to be transmitted by a predetermined number (n) of bits;
   forming, by the first circuitry, a plurality of transition inducing packets having the predetermined number (n) of bits, different from the transmission preparatory packets, and not complementary to the transmission preparatory packets;
   forming, by the first circuitry, transition included data packets by performing a logical operation using the transition inducing packets and the respective transmission preparatory packets; and
   transmitting the transition included data packets and the different transition inducing packets from the first circuitry to a second circuitry,
   wherein the forming of the transition included data packets is performed using transition inducing packets selected according to a number of transitions included in the data packets among the plurality of transition inducing packets.

7. The data transmission method of claim 6, wherein the forming of the transition included data packets is performed by selecting a transition inducing packet maximizing the number of transitions in the transition included data packets.

8. The data transmission method of claim 6, wherein the forming of the transition included data packets is performed by selecting a transition inducing packet minimizing the number of transitions in the transition included data packets.

9. The data transmission method of claim 6, wherein the forming of the transition included data packets is performed by selecting a transition inducing packet maximizing the number of transitions in the transition included data packets during a process of forming a predetermined number of data packets, and then is performed by selecting a transition inducing packet minimizing the number of transitions in the transition included data packets.

10. A data transmission method between circuitries, the method comprising:
    forming, by a first circuitry, a plurality of transmission preparatory packets by dividing data to be transmitted by a predetermined number (n) of bits;

forming, by the first circuitry, a transition inducing packet having the predetermined number (n) of bits and different from the transmission preparatory packets;

forming, by the first circuitry, transition included data packets by performing a logical operation using the transition inducing packet and the respective transmission preparatory packets;

transmitting a training pattern from the first circuitry to a second circuitry so that the second circuitry tracks a clock; and transmitting the transition included data packets and the transition inducing packet from the first circuitry to the second circuitry.

11. The data transmission method of claim 10, wherein the training pattern is a packet filled with a predetermined number of 1s or 0s.

12. The data transmission method of claim 10, further comprising, after the transmitting of the training pattern, further transmitting an align packet for distinguishing between the transition included data packets and the transition inducing packet from the first circuitry to the second circuitry.

13. The data transmission method of claim 12, wherein the align packet is in the same form as the training pattern.

14. A data restoration method comprising:

receiving, by a second circuitry, a tuning signal transmitted from a first circuitry to the second circuitry;

tracking, by the second circuitry, a clock using the tuning signal received from the first circuitry;

receiving, by the second circuitry, a transition inducing packet and a transition included data packet from the first circuitry;

restoring, by the second circuitry, the clock using the received transition included data packet and the received transition inducing packet;

sampling, by the second circuitry, the transition inducing packet and the transition included data packet using the restored clock; and restoring, by the second circuitry, transmitted data by performing a logical operation on the sampled transition inducing packet and the sampled transition included data packet.

15. The data restoration method of claim 14, wherein the training pattern is a packet filled with a predetermined number of 1s or 0s.

16. The data restoration method of claim 14, wherein the training pattern has predetermined number of alternating 1s or 0s.

17. The data restoration method of claim 14, further comprising:

receiving, by the second circuitry and after the receiving of the training pattern, an align packet for distinguishing between the transition included data packet and the transition inducing packet.

18. The data restoration method of claim 16, wherein the align packet is in the same form as the training pattern.

19. The data restoration method of claim 14, wherein the restoring of the clock using the tuning signal comprises:

tracking a frequency of the clock; and locking a phase of the clock by tracking the phase of the clock.

20. The data restoration method of claim 14, wherein the first circuitry includes a timing controller of a display device and the second circuitry includes a data driver of the display device.

* * * * *